(12) United States Patent
Pinkerton

(10) Patent No.: US 8,488,183 B2
(45) Date of Patent: Jul. 16, 2013

(54) MOVING LABELS IN GRAPHICAL OUTPUT TO AVOID OVERPRINTING

(75) Inventor: Glenn L. Pinkerton, Lafayette, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 336 days.

(21) Appl. No.: 13/045,412

(22) Filed: Mar. 10, 2011

(65) Prior Publication Data
US 2012/0229857 A1    Sep. 13, 2012

(51) Int. Cl.
*G06F 15/00*    (2006.01)

(52) U.S. Cl.
USPC ........................................................ 358/1.18

(58) Field of Classification Search
USPC ........................................................ 358/1.18
See application file for complete search history.

(56) References Cited

U.S. PATENT DOCUMENTS

| | | | |
|---|---|---|---|
| 7,131,060 B1 | 10/2006 | Azuma | |
| 7,425,968 B2 | 9/2008 | Gelber | |
| 2008/0018935 A1* | 1/2008 | Gauthier et al. | 358/1.18 |

* cited by examiner

*Primary Examiner* — Saeid Ebrahimi Dehkordy
(74) *Attorney, Agent, or Firm* — Osha Liang LLP

(57) ABSTRACT

A method for rendering a drawing, including: identifying fixed objects (FOs) having footprints within the drawing; identifying moveable objects (MOs) having locations within the drawing associated with the footprints; identifying, within a coarse pixel array (CPA), coarse pixels corresponding to the footprints; setting the coarse pixels corresponding to the footprints to an occupied status; selecting a MO having a first location; identifying a first set of coarse pixels in the CPA corresponding to a first frame of the MO; determining that at least one coarse pixel of the first set of coarse pixels is in the occupied status; generating a second location for the MO; identifying a second set of coarse pixels in the CPA corresponding to a second frame of the MO; setting the second set of coarse pixels to the occupied status; and rendering the drawing by placing the MO at the second location on a page.

20 Claims, 14 Drawing Sheets

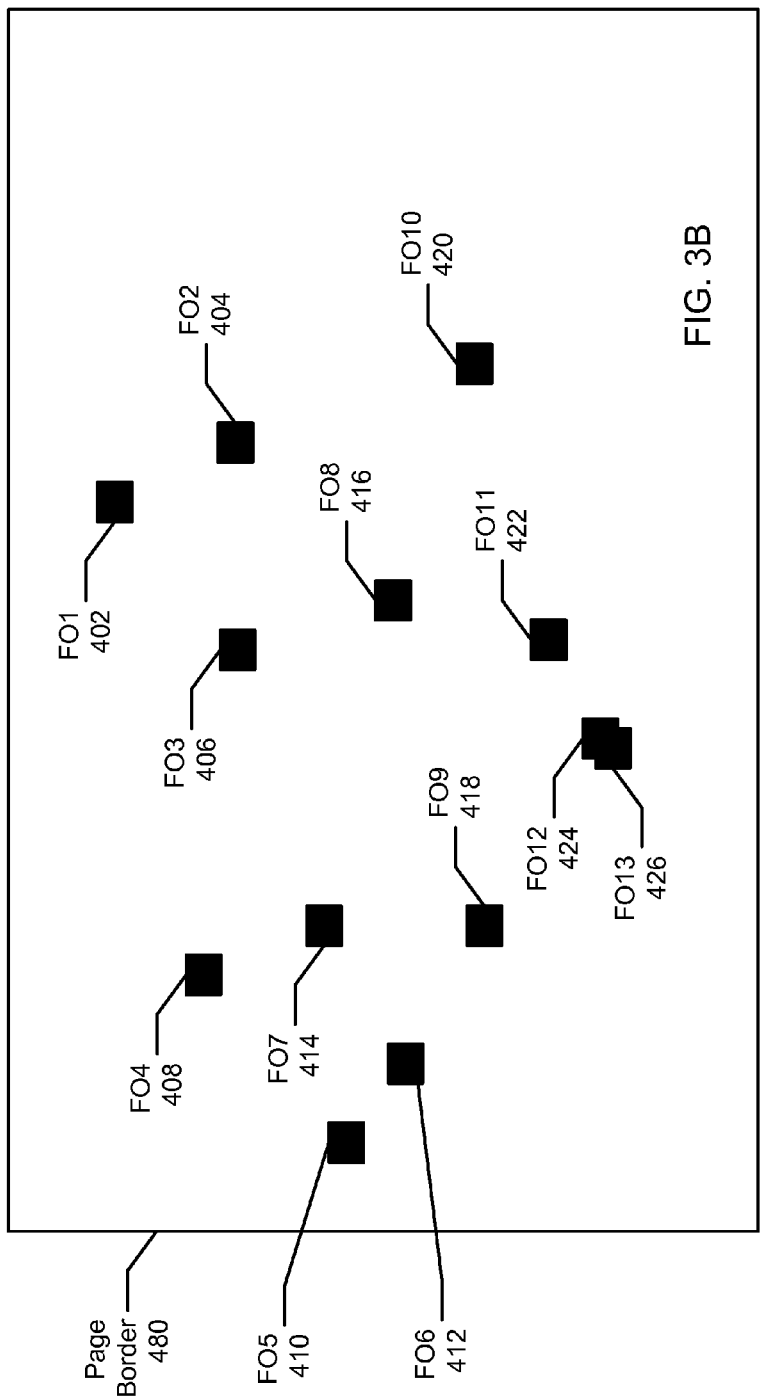

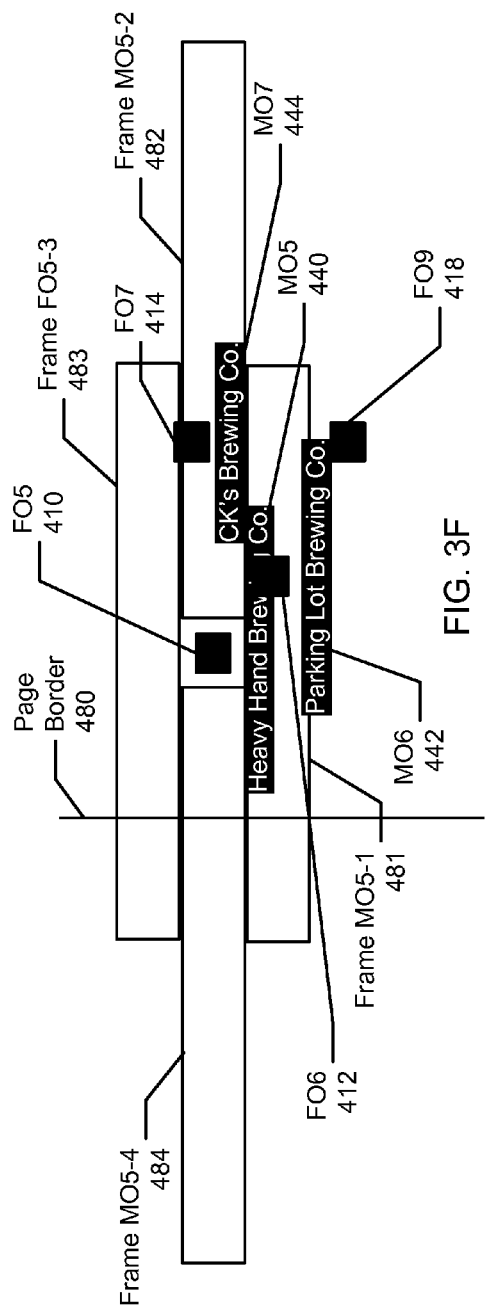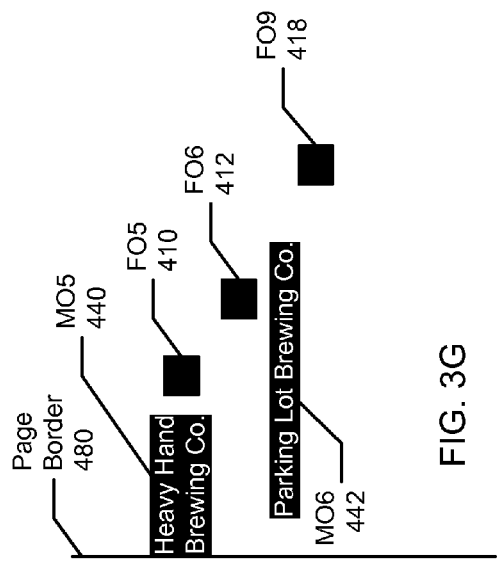
FIG. 3F
FIG. 3G

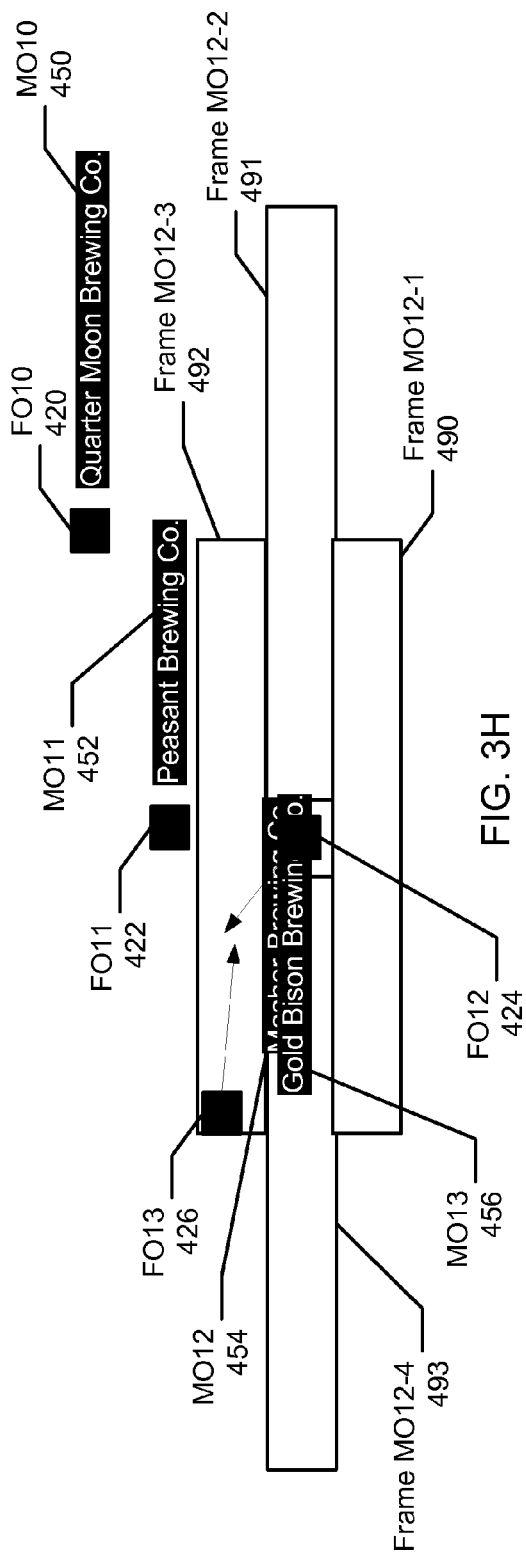
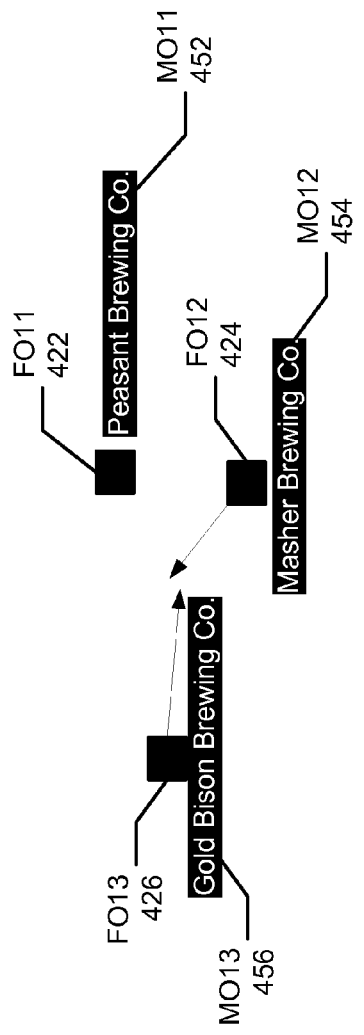
FIG. 3H
FIG. 3I

MOVING LABELS IN GRAPHICAL OUTPUT TO AVOID OVERPRINTING

BACKGROUND

A page may include a number of objects. Some of the objects should remain in relatively fixed positions on the page, while other objects may be moved to one of a number of positions on the page. In a number of applications, a page may have a number of objects that overlap on the page, making the objects difficult to read and/or distinguish. At other times, when no overlap may exist between objects, the objects may be clustered too close together to be clearly interpreted.

SUMMARY

In general, in one aspect, the invention relates to a method for rendering a drawing. The method comprising: identifying a plurality of fixed objects (FOs) having a plurality of footprints within the drawing; identifying a plurality of moveable objects (MOs) having a plurality of locations within the drawing associated with the plurality of footprints; identifying, using a computer processor and within a coarse pixel array (CPA) having a two-dimensional array of coarse pixels representing a page space of the drawing, a plurality of coarse pixels corresponding to the plurality of footprints; setting, using the computer processor, the plurality of coarse pixels corresponding to the plurality of footprints to an occupied status; selecting, using the computer processor, a MO of the plurality of MOs having a first location; identifying, using the computer processor and based on the first location, a first set of coarse pixels in the CPA corresponding to a first frame of the MO; determining, using the computer processor, that at least one coarse pixel of the first set of coarse pixels is in the occupied status; generating, using the computer processor and in response to determining that the at least one coarse pixel of the first set of coarse pixels is in the occupied status, a second location for the MO; identifying, using the computer processor and based on the second location, a second set of coarse pixels in the CPA corresponding to a second frame of the MO; setting the second set of coarse pixels of the MO to the occupied status; and rendering the drawing by placing the MO at the second location on a page.

In general, in one aspect, the invention relates to a system for rendering a drawing. The system comprising: a hardware processor; a coarse pixel array (CPA) having a two-dimensional array of coarse pixels representing a page space of the drawing; a frame module configured to generate a first frame and a second frame for a moveable object (MO); a layout engine executing on the hardware processor and configured to: identify a plurality of fixed objects (FOs) having a plurality of footprints within the drawing; set a plurality of coarse pixels in the CPA corresponding to the plurality of footprints to an occupied status; identify, based on a first location of the MO, a first set of coarse pixels in the CPA corresponding to the first frame; determine that at least one coarse pixel of the first set of coarse pixels is in the occupied status; identify, based on a second location associated with the MO, a second set of coarse pixels in the CPA corresponding to the second frame of the MO; and render the drawing by placing the MO at the second location on a page.

In general, in one aspect, the invention relates to a non-transitory computer readable storage medium storing instructions for rendering a drawing. The instructions comprising functionality to: identify a plurality of fixed objects (FOs) having a plurality of footprints within the drawing; identify a plurality of moveable objects (MOs) having a plurality of locations within the drawing associated with the plurality of footprints; identify, within a coarse pixel array (CPA) having a two-dimensional array of coarse pixels representing a page space of the drawing, a plurality of coarse pixels corresponding to the plurality of footprints; set the plurality of coarse pixels corresponding to the plurality of footprints to an occupied status; select a MO of the plurality of MOs having a first location; identify, based on the first location, a first set of coarse pixels in the CPA corresponding to a first frame of the MO; determine that at least one coarse pixel of the first set of coarse pixels is in the occupied status; generate, in response to determining that the at least one coarse pixel of the first set of coarse pixels is in the occupied status, a second location for the MO; identify, based on the second location, a second set of coarse pixels in the CPA corresponding to a second frame of the MO; set the second set of coarse pixels of the MO to the occupied status; and render the drawing by placing the MO at the second location on a page.

Other aspects of the invention will be apparent from the following description and the appended claims.

BRIEF DESCRIPTION OF DRAWINGS

FIGS. 3A-3J show examples in accordance with one or more embodiments of the invention.

DETAILED DESCRIPTION

Figure 1A:
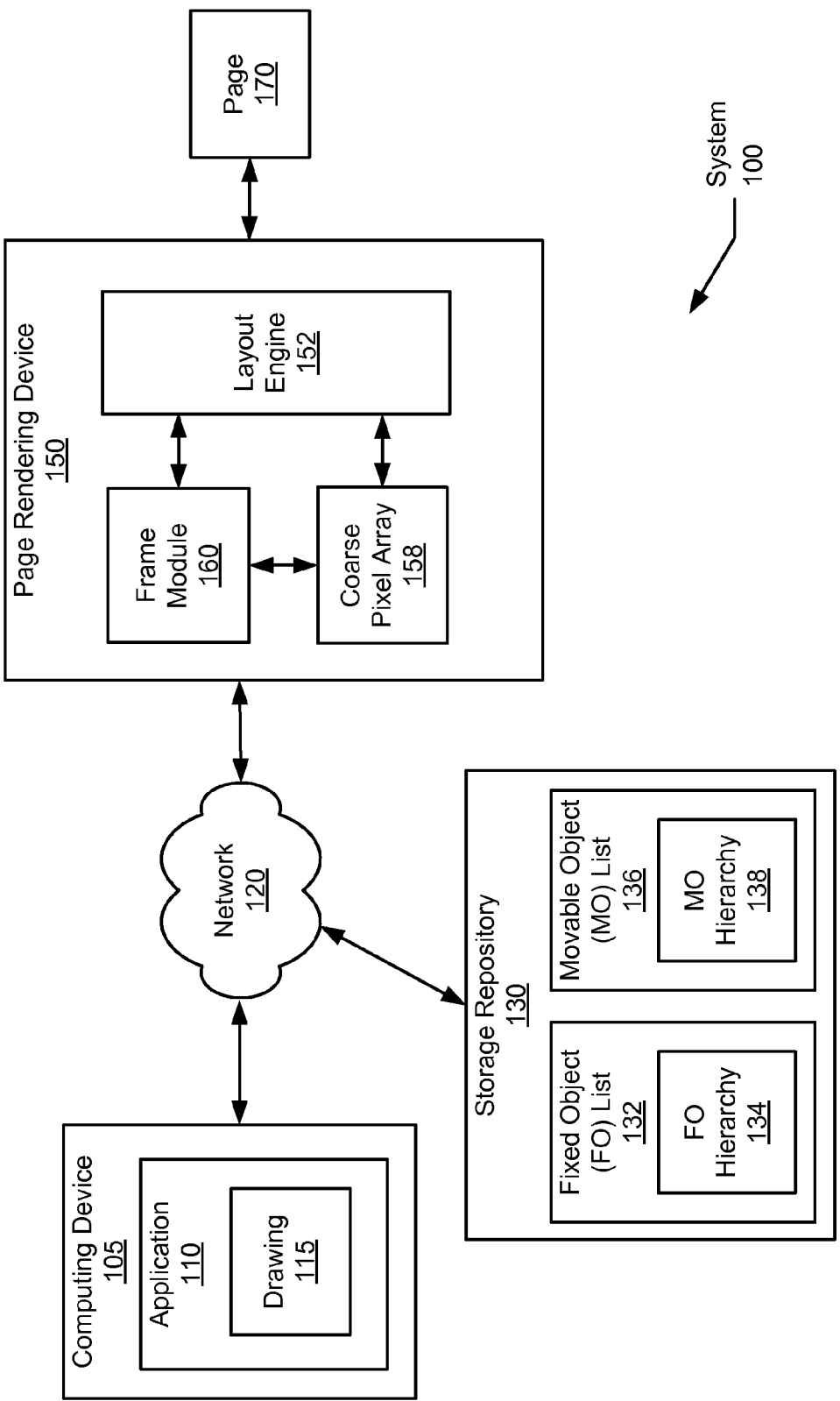
FIG. 1A shows a block diagram depicting a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for positioning objects (i.e., fixed objects, moveable objects) on a page. Specifically, fixed objects, followed by moveable objects, are set on the page without overlapping each other. A coarse pixel array (CPA) may be a two-dimensional array of coarse pixels representing a page space of the drawing having the objects. An object that is set to a location on the page is represented by a set of coarse pixels, located on the CPA, that are set to an occupied status. An object that needs to be positioned is then represented by its own set of coarse pixels and is positioned at an initial location. If at least one coarse pixel of the set of coarse pixels of this object is already in the occupied status, then a new location is used. The process repeats until all objects have been positioned on the page (i.e., the drawing is rendered). In embodiments of the invention, a frame corresponding to a scaled version of the object's footprint is used to position the object.

FIG. 1 shows a system (100) in accordance with one or more embodiments of the invention. As shown in FIG. 1, the system (100) has multiple components including a page rendering device (PRD) (150), a storage repository (130), and a client computer (105). The PRD (150) may be a printer, an electronic reader, etc. The computing device (105) may be a personal computer (PC), a desktop computer, a mainframe, a server, a telephone, a kiosk, a cable box, a personal digital assistant (PDA), an electronic reader, a mobile phone, a smart phone, etc. The storage repository (130) may correspond to any type of hardware storage device (e.g., hard drive, tape, memory, etc.). There may be direct connections (e.g., universal serial bus (USB) connection) between the computing device (105), the PRD (150), and the storage repository (130). Alternatively, the computing device (105), the PRD (150), and the storage repository (130) may be connected using a network (120) having wired and/or wireless segments.

In one or more embodiments of the invention, the PRD (150) and/or the storage device (130) are located on the computing device (105). In such embodiments, the PRD (150) may correspond to any combination of hardware and software on the computing device (105) for rendering a drawing. In one or more embodiments of the invention, the storage device (130) is located on the PRD (150).

In one or more embodiments of the invention, the computing device (105) executes the user application (110). The user application (110) is a software application operated by a user and configured to obtain, input, generate, display, and/or print a drawing (e.g., Drawing (115)). Accordingly, the user application (110) may be a word-processing application, a spreadsheet application, a desktop publishing application, a graphics application, a photograph printing application, an Internet browser, a cartography application, a graphical plotting application, etc. The user application (110) may generate new drawings and/or obtain previously saved drawings.

In one or more embodiments of the invention, the drawing (115) includes one or more fixed objects and one or more moveable objects. The drawing (115) may also include one or more background objects. A background object corresponds to an item within the drawing that can be overprinted. Examples of background objects include background images, polygon fills, some symbols, and some lines (e.g., horizontal and vertical scaling lines within a chart). A fixed object corresponds to an item within the drawing with a position that gives meaning to the overall drawing. In one or more embodiments of the invention, a fixed object should not be overprinted. Examples of fixed objects include some clipart, some shapes, markers for scatter data plots, some symbols on a map, etc. In contrast, a moveable object corresponds to an item in the drawing that may be relocated without distorting the overall meaning of the drawing. Further, a moveable object may be used to identify and/or describe a fixed object. For example, a moveable object may be a text string (i.e., label) identifying and/or describing a fixed object.

In one or more embodiments of the invention, the multiple fixed objects within the drawing (115) and the multiple moveable objects within the drawing (115) may be ranked (i.e., prioritized). In other words, there exists hierarchies of fixed objects and moveable objects. The storage device (130) may include a list of all fixed objects within the drawing (115) (i.e., Fixed Object (FO) List (132)) and a list of all moveable objects within the drawing (115) (i.e., Moveable Object (MO) List (136)). The FO hierarchy (134) identifies the rankings of the fixed objects within the drawing (115). Similarly, the MO hierarchy (138) identifies the rankings of the moveable objects in the drawing (115).

Figure 1B:
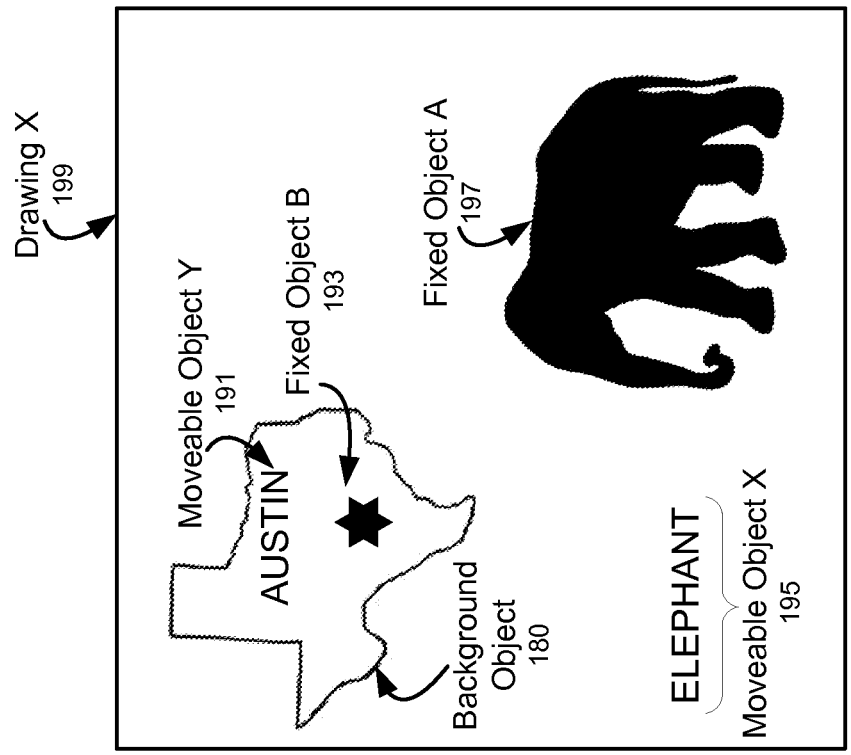
FIG. 1B shows a drawing with multiple objects in accordance with one or more embodiments of the invention.

FIG. 1B shows a drawing (i.e., Drawing X (199)) in accordance with one or more embodiments of the invention. As shown in FIG. 1B, Drawing X (199) includes multiple fixed objects (i.e., Fixed Object A (197), Fixed Object B (193)), multiple moveable objects (i.e., Moveable Object X (195), Moveable Object Y (193)), and a background object (180). Fixed Object A (197) is a clipart element and Moveable Object X (195) is a text string (i.e., "ELEPHANT") identifying and describing Fixed Object A (197). Fixed Object B (193) is a symbol and Moveable Object Y (191) is a text string (i.e., "AUSTIN") identifying and describing Fixed Object B (191). As also shown in FIG. 1B, Fixed Object B (193) and Moveable Object Y (191) are printed on the background image (180). Further, Moveable Object X (195) is adjacent to corresponding Fixed Object A (197), while Moveable Object Y (191) is adjacent to corresponding Fixed Object B (193).

Those skilled in the art, having the benefit of this detailed description, will appreciate that Moveable Object X (195) and Moveable Object Y (191) may be relocated without distorting the meaning of Drawing X (199) and while still identifying and/or describing their corresponding fixed objects. For example, Moveable Object X (195) may be relocated within the vicinity of Fixed Object A (197) without distorting the meaning of Drawing X (199) and while still identifying and describing Fixed Object A (197). Similarly, Moveable Object Y (191) may be relocated within the vicinity of Fixed Object B (193) without distorting the meaning of Drawing X (199) and while still identifying and describing Fixed Object B (193).

Those skilled in the art, having the benefit of this detailed description, will also appreciate that a drawing may have any number of fixed objects and moveable objects. Accordingly, when many moveable objects exist, one or more moveable objects may overlap each other. In such situations, relocation of one or more of the moveable objects from their initial locations to new locations may be executed to make the drawing easier to read and comprehend. The initial positions of the moveable objects may be specified within the drawing.

Referring back to FIG. 1A, in one or more embodiments, the PRD (150) includes a coarse pixel array (CPA) (158). The CPA (158) is a multidimensional (i.e., 2-dimensional) array representing a page space of the drawing (115). Accordingly, the CPA (158) may have any number of coarse pixels. In one or more embodiments of the invention, each coarse pixel corresponds to $x/72$ in$^2$ of the drawing (115), where x is the smallest font point used in the drawing (115).

In one or more embodiments of the invention, the CPA (158) records/tracks where fixed objects and moveable objects have been drawn. Specifically, the coarse pixels in the CPA (158) corresponding to the footprint (i.e., area, perimeter, and/or bounding box) of the drawn fixed objects and drawn moveable objects are set to an occupied status. In one or more embodiments of the invention, the CPA (158) is a bit array. In such embodiments, all coarse pixels having a "0" value are in the vacant (i.e., non-occupied) status, while all coarse pixels having the "1" value are in the occupied status. Those skilled in the art, having the benefit of this detailed description, will appreciate that any two values may be used to denote the occupied status and vacant (i.e., non-occupied) status.

Figure 1C:
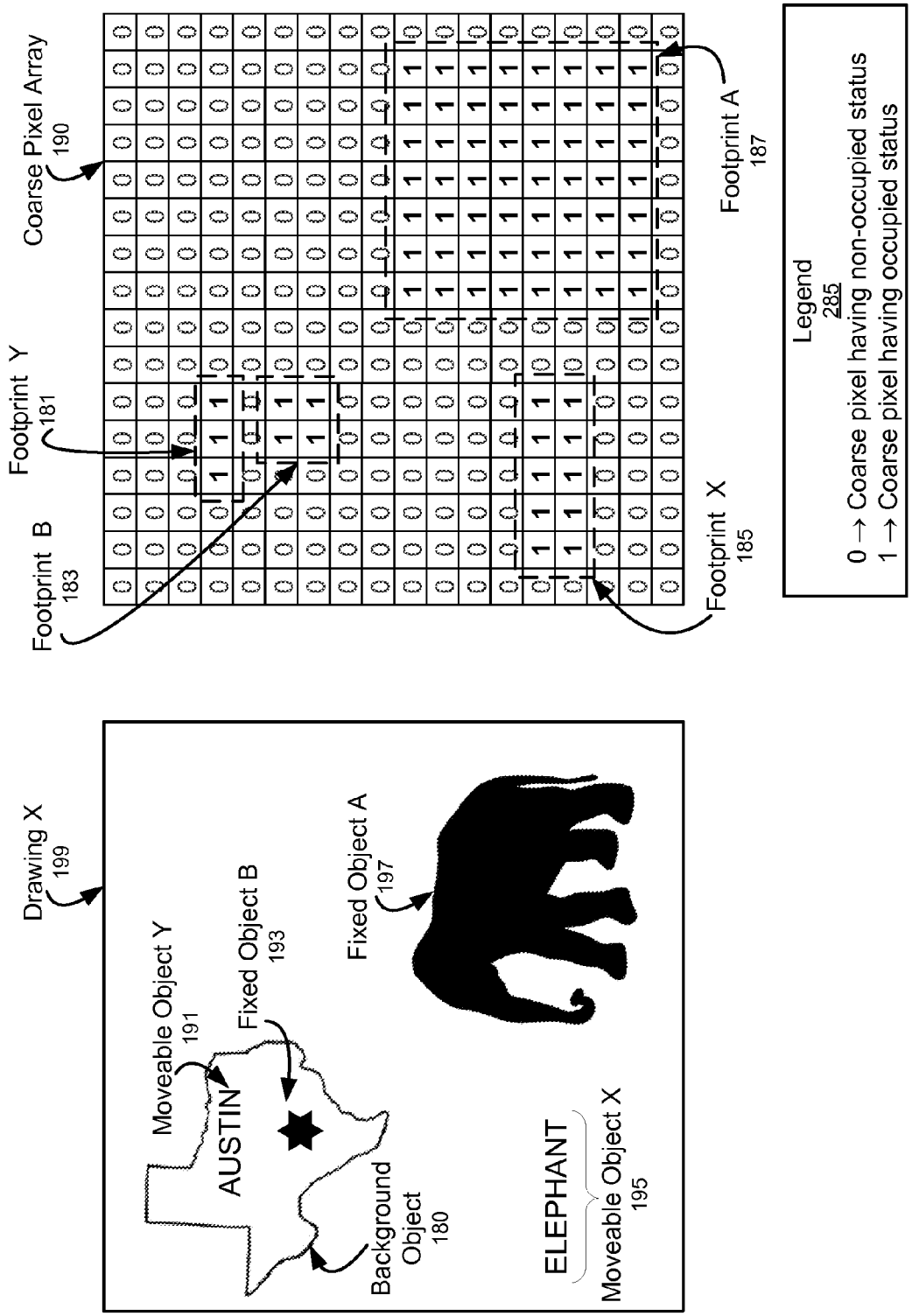
FIG. 1C shows a drawing and a coarse pixel array (CPA) in accordance with one or more embodiments of the invention.

FIG. 1C shows a coarse pixel array (190) in accordance with one or more embodiments of the invention. The CPA (190) represents Drawing X (199). As shown in FIG. 1C, the coarse pixels in the CPA (190) corresponding to the footprints of the fixed objects and the moveable objects are set to the occupied status. For example, Footprint A (187) corresponds to Fixed Object A (197). Accordingly, the coarse pixels corresponding to Footprint A (187) are set to the occupied status. Similarly, Footprint B (183) corresponds to Fixed Object B (193). Accordingly, the coarse pixels corresponding to Footprint B (183) are set to the occupied status. Further, Footprint X (185) corresponds to Moveable Object X (195). Accordingly, the coarse pixels corresponding to Footprint X (185) are set to the occupied status. Further still, Footprint Y (181) corresponds to Moveable Object Y (191). Accordingly, the coarse pixels corresponding to Footprint Y (181) are set to the occupied status. In one or more embodiments of the invention, the CPA (190) does not record/track the footprint of any background objects (e.g., Background Object (180)).

Referring back to FIG. 1A, in one or more embodiments of the invention, the PRD (150) includes a frame module (160). The frame module (160) is configured to calculate different sized frames for each moveable object in the drawing (115). In one or more embodiments of the invention, where fixed objects overlap, the frame module (160) is also configured to calculate frames for one or more of the overlapping fixed objects. Each frame is effectively a container enclosing the moveable or fixed object. Accordingly, the smallest frame may correspond to the footprint of the object, while the largest frame may correspond to a scaled (i.e., enlarged) version of the footprint. A frame may correspond to the footprint scaled by any scale factor. For example, if a moveable object is a text string having 10 point font, the largest frame may correspond to the bounding box enclosing an 80 point font version of the text string. The frame may be used in place of the footprint of the object when positioning the object on the page (discussed below).

Figure 1D:
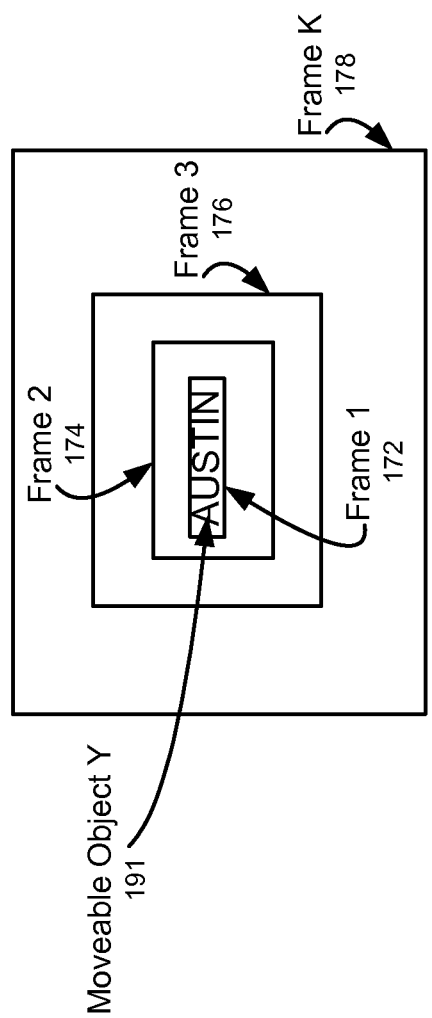
FIG. 1D shows multiple frames generated for a moveable object in accordance with one or more embodiments of the invention.

FIG. 1D shows multiple frames generated for a moveable object in accordance with one or more embodiments of the invention. As shown in FIG. 1D, K frames (i.e., Frame 1 (172), Frame 2 (174), Frame 3 (176), . . . , Frame K (178)) have been created for Moveable Object Y (191). Frame 1 (172) is the smallest frame and effectively corresponds to the footprint of Moveable Object Y (191). In contrast, Frame K (178) is the largest frame.

Referring back to FIG. 1A, in one or more embodiments of the invention, the PRD (150) includes a layout engine (152). The layout engine (152) is configured to select an object (e.g., FO, MO) for processing (i.e., positioning the object (e.g., FO, MO) on the page to avoid overlapping with other objects already positioned on the page). The order in which objects are selected by the layout engine (152) may be based on a hierarchy (e.g., FO hierarchy (134), MO hierarchy (138)).

The layout engine (152) may also be configured to identify a set of coarse pixels in the CPA (160) that correspond to a frame and/or footprint of an object (e.g., FO, MO). The layout engine (152) may further be configured to determine whether any coarse pixels within a set of coarse pixels is already set to an occupied status. In other words, in one or more embodiments of the invention, the layout engine (152) is configured to determine whether a frame and/or footprint of an object (e.g., FO, MO) overlaps with one or more objects (e.g., FO, MO) that has previously been drawn.

In one or more embodiments of the invention, the layout engine (152) is also configured to select a different (i.e., revised or new) location for the object (e.g., FO, MO). The different location may be generated/selected in one of a number of ways, including but not limited to an algorithm, a default schedule (e.g., bottom, top, left, right, bottom left, bottom right, top right, top left), a random location generator, or some other suitable means of selecting a different location.

The layout engine (152) may also be configured to set the coarse pixels of the CPA (160) corresponding to an object to an occupied status. The layout engine (152) may set the footprint of the object to the occupied status when a frame and/or footprint of the object (e.g., FO, MO) fails to overlap with any other objects (e.g., FO, MO). The layout engine (152) may further be configured to render the drawing (115) by placing the fixed objects, moveable objects, and background objects on a page (170).

Figure 2A:
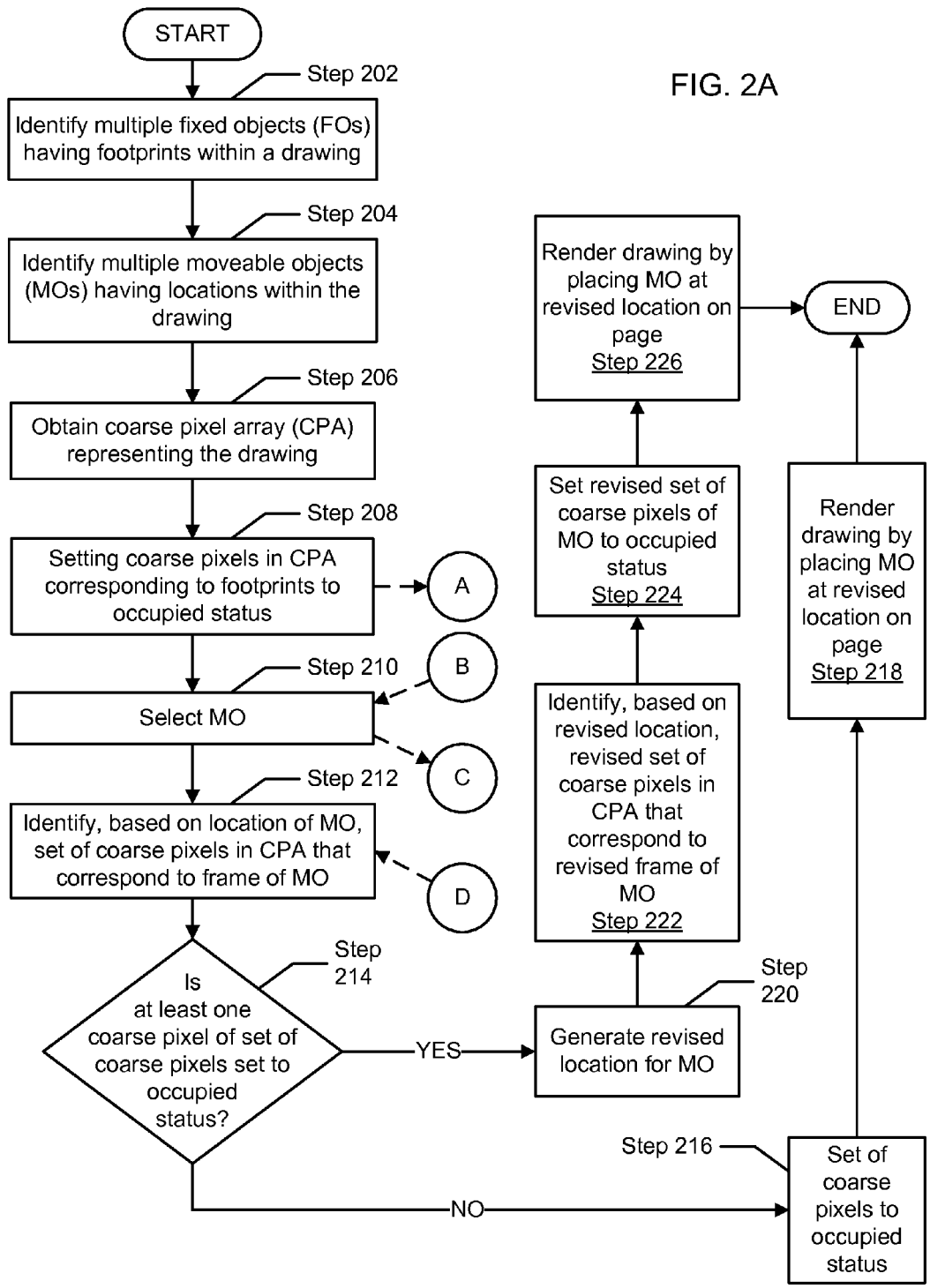
FIGS. 2A-2C show flowcharts in accordance with one or more embodiments of the invention.
Figures 2B, 2C:
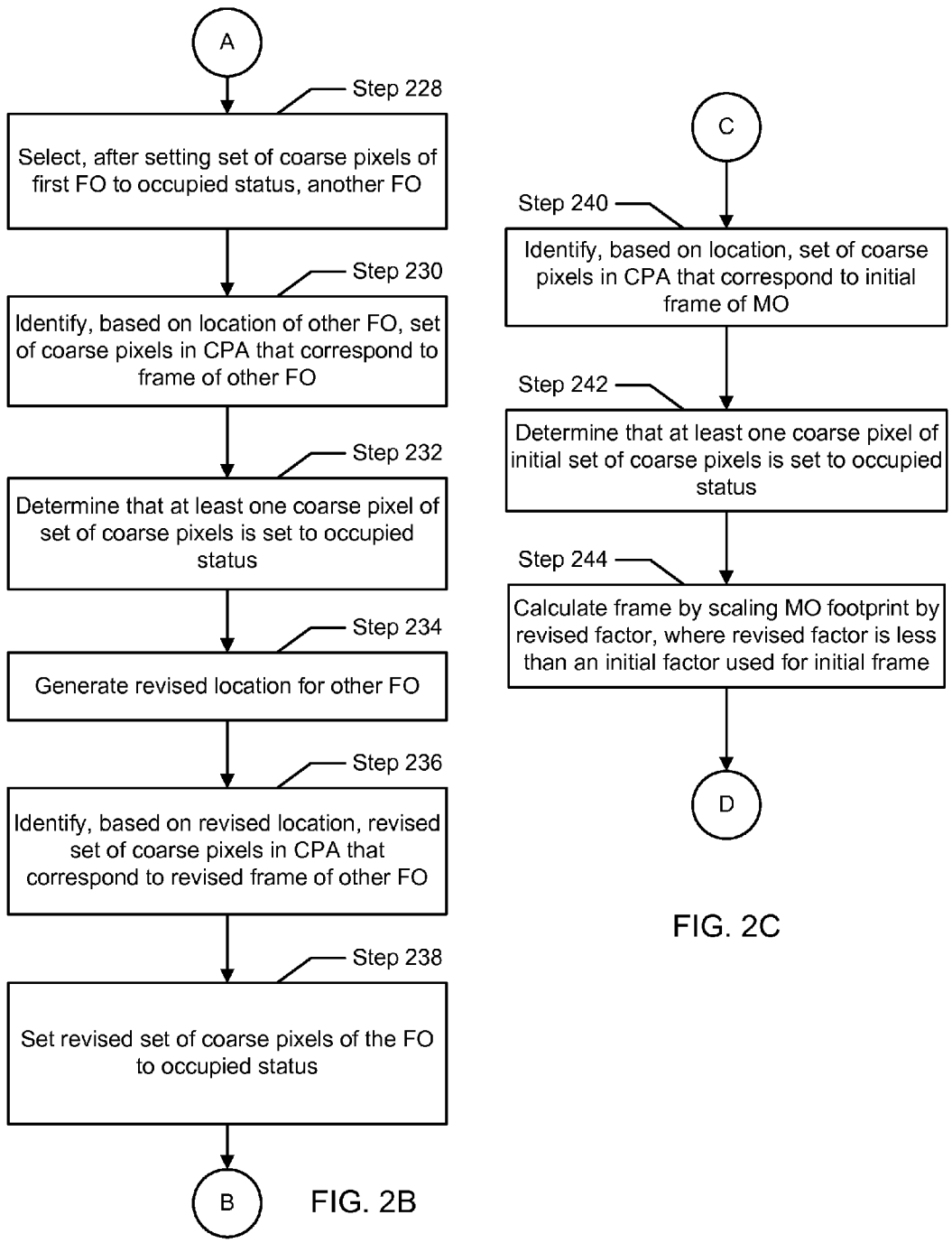

FIGS. 2A through 2C show flowcharts in accordance with one or more embodiments of the invention. The processes shown in FIGS. 2A through 2C may be used, for example, with the system of FIG. 1 to render a drawing. While the various steps in these flowcharts are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIGS. 2A through 2C, may be included in performing this method. Accordingly, the specific arrangement of steps shown in FIGS. 2A through 2C should not be construed as limiting the scope of the invention.

In one or more embodiments of the invention, a particular computing device, as described, for example, in FIG. 1A above and FIG. 5 below, is used to perform one or more of the steps described below.

Referring to FIG. 2A, in STEP 202, the footprints of the FOs in the drawing are identified. The footprints may correspond to the perimeters, the areas, and/or the bounding boxes of the FOs within the drawing.

A fixed object may be moved on the page. For example, if two fixed objects overlap on a page, then at least one of those overlapping fixed objects may be moved (for example, in a manner similar to avoiding overlap of MOs, described below) to avoid the overlap.

In STEP 204, the MOs within the drawing are identified. In one or more embodiments of the invention, the MOs are associated with the footprints of the FOs on the page. For example, each MO may be a label (i.e., text string with a font size) identifying and/or describing one of the FOs. Each MO may also have an initial location within the drawing. For example, the initial location of the MO may be adjacent to its corresponding FO.

In STEP 206, a CPA representing a page space of the drawing is obtained. In one or more embodiments of the invention, the CPA is a multidimensional array representing the drawing. Further, each coarse pixel in the CPA corresponds to an area of the drawing.

In STEP 208, coarse pixels in the CPA corresponding to the footprints are set to an occupied status. In one or more embodiments of the invention, the CPA is a bit array. In such embodiments, each coarse pixel may be set to "0" or "1". Accordingly, "1" may be used to denote the occupied status, while "0" may be used to denote the vacant (i.e., non-occupied) status.

In STEP 208, if an overlap exists among the FOs, then a process as described below with respect to FIG. 2B, starting with STEP 228, may be used to avoid the overlap among the FOs.

In STEP 210, a MO of the drawing is selected. In one or more embodiments, the MO is selected using some methodology. For example, the MO may be selected based on a MO hierarchy. The MO also may be selected using some other methodology, including but not limited to the size of the MO and the location of the MO. The location of the MO may be the initial location of the MO on the page. If a frame of the MO needs to be adjusted, then a process as described below with respect to FIG. 2C, starting with STEP 240, may be used to change the frame of the MO.

In STEP 212, a set of coarse pixels in the CPA that correspond to a frame of the MO is identified. The set of coarse pixels may be based on the initial location of the MO. A frame may correspond to a scaled version of the MO's footprint.

In STEP 214, a determination is made as to whether at least one coarse pixel in the set of coarse pixels is in the occupied status. In other words, a determination is made as to whether the frame of the MO overlaps with any of the footprints of the FOs (as well as any other MOs that have previously been affixed to a position on the page). When it is determined that non of the identified coarse pixels are in the occupied status, the process proceeds to STEP 216. If at least one coarse pixel in the set of coarse pixels is in the occupied status, then the process proceeds to STEP 220.

In STEP 216, the set of coarse pixels is set to the occupied status. In other words, the MO is affixed to its initial location on the page. In STEP 218, the drawing is rendered having the FOs at the footprints and the MO at its initial location. After STEP 218 is completed, the process ends.

In STEP 220, a revised location for the MO is selected. The revised location may be selected in one of a number of ways. For example, the revised location may be on the opposite side of the FO, with respect to the initial location. If there are no available locations adjacent to the FO to which the MO is associated, then the revised location may be located away from the FO. In such a case, a callout may be added to link the MO at the revised location to the FO. If a callout is added to link the MO to the FO, then the callout may become part of the footprint of the MO.

In STEP 222, a revised set of coarse pixels in the CPA that correspond to the frame of the MO is identified. The set of coarse pixels may be based on the revised location of the MO. In STEP 224, the revised set of coarse pixels of the MO is set to the occupied status. In other words, the MO becomes fixed in its original position on the page because there is no overlap. In STEP 226, the drawing is rendered having the FOs and the MO at its revised location. After STEP 226 is completed, the process ends.

FIG. 2B describes a method for resolving an overlap between FOs. FIG. 2B also describes how a hierarchy may be used to determine an order that the FOs are organized on the page. Embodiments of the invention may also apply some or all of the methods described in this FIG. 2B to MOs. STEP 228 in FIG. 2B may follow, for example, STEP 208 in FIG. 2A.

Referring to FIG. 2B, in STEP 228, after the coarse pixels corresponding to the first FO are set to the occupied status, another FO is selected. In one or more embodiment of the invention, a FO hierarchy, as described above with respect to FIG. 1, may be used to select the order in which the FOs are processed.

In STEP 230, a set of coarse pixels in the CPA that correspond to a frame of the other FO is identified. The set of coarse pixels may be based on the location of the FO. A frame may be calculated by scaling the footprint of the FO according to a scale factor. The scale factor may be less than one (for example, when the size of one or more objects must be shrunk to allow all objects on a page to fit without overlap), one (i.e., the frame and the footprint are the same), or greater than one.

In STEP 232, at least one coarse pixel in the set of coarse pixels is determined to be set to the occupied status. In other words, the FO overlaps, at least in part, the first FO that has been fixed to its initial location. Consequently, the FO needs to be moved so that an overlap with the first FO is avoided. In STEP 234, a revised location is generated for the FO. The revised location for the FO may be generated in one of a number of ways, such as those described above in STEP 220 for a MO.

In STEP 236, a revised set of coarse pixels in the CPA that correspond to the frame of the FO is identified. The set of coarse pixels may be based on the revised location of the FO. In STEP 238, the revised set of coarse pixels of the FO is set to the occupied status. After STEP 238 is completed, the process may revert, for example, to STEP 210 in FIG. 2A.

FIG. 2C describes a method for changing a frame (e.g., making the frame larger or smaller) of an object. Changing a frame may be used as a way to reduce overlap of objects on a page. For example, a frame may be decreased to keep a label at a particular location on the page. In such a case, a frame may be calculated by scaling the footprint of the object by a scale factor. The process described in FIG. 2C may be used for a frame of a FO and/or a MO. STEP 240 in FIG. 2C may follow, for example, STEP 210 in FIG. 2A.

Referring to FIG. 2C, in STEP 240, an initial set of coarse pixels in the CPA that correspond to an initial frame of an MO is identified. The initial set of coarse pixels that corresponds to the frame of the MO may be based on an initial location of the MO. In STEP 242, a determination is made that at least one coarse pixel of the initial set of coarse pixels is set to the occupied status. In other words, the initial frame of the MO overlaps, at least in part, an object that has already been positioned on the page.

In STEP 244, a different frame is calculated by scaling the MO footprint by a revised factor, where the revised factor is less than a factor used for the initial frame. In one or more embodiments of the invention, the revised factor is greater than the factor used for the initial frame. The revised factor may be selected using one of a number of methods. For example, an algorithm may exist to determine the revised factor based on a desired frame size, a desired spacing between objects, a number of objects still needing to be positioned, and the footprint of the object. When used in conjunction with FIG. 2A, the different frame, for example, is the frame of STEP 212.

FIGS. 3A-3J show an example in accordance with one or more embodiments of the invention. The example shown in FIGS. 3A-3J may be used, for example, with the system (100), to reduce overprinting.

Figure 3A:
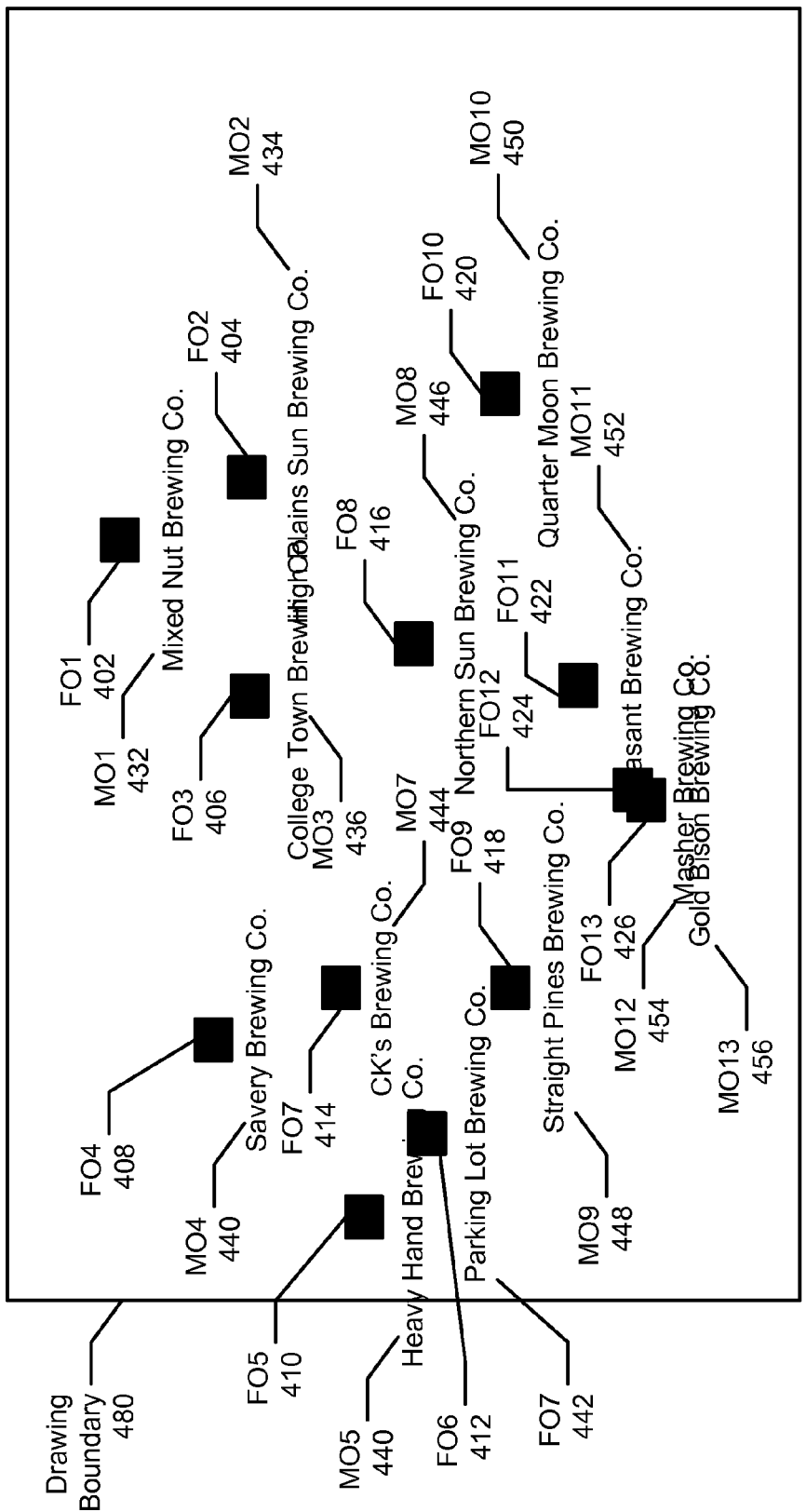

In this example, there exists a drawing showing the locations of microbreweries in Boulder, Colo. The drawing is shown in FIG. 3A. The drawing includes a number of symbols (i.e., squares) (i.e., FO1 (402), FO2 (404), FO3 (406), FO4 (408), FO5 (410), FO6 (412), FO7 (414), FO8 (416), FO9 (418), FO10 (420), FO11 (422), FO12 (424), and FO13 (426)) that are fixed objects. Each square is a microbrewery in Boulder, Colo. The drawing also has labels (i.e., MO1 (432), MO2 (434), MO3 (436), MO4 (438), MO5 (440), MO6 (442), MO7 (444), MO8 (446), MO9 (448), MO10 (450), MO11 (452), MO12 (454), and MO13 (456)). As shown in FIG. 3A, several of the objects (e.g., FO12 (424) and FO13 (426), FO6 (412) and MO5 (440)) overlap.

It is determined that the FOs are to be processed starting with the Northern-most (i.e., top of the page) location on the page to the Southern-most location on the page. In this example, FO1 (402) is positioned on the page first, followed by FO4 (408), continuing down the page until ending with FO13 (426).

The footprint (e.g., square) of each location is scaled by a factor of one to generate the frame. In other words, the footprint and the frame of each FO is the same in this example.

Further, the frame is represented by the area of the square. FIG. 3B shows the drawing border (480) with the frames of the FOs in their initial positions.

Each FO is positioned so that none of the FOs overlap. As shown in FIG. 3B, none of the FOs, in their initial locations, overlap except for FO12 (424) and FO13 (426). As shown in FIG. 3C, the overlap is avoided by moving FO12 (424) and FO13 (426) from their initial locations to revised locations and using callouts to connect FO12 (424) and FO13 (426) from the revised locations to each of their respective initial locations. The coarse pixels in the CPA corresponding to each of the FO footprints are set to an occupied status.

Figure 3D:
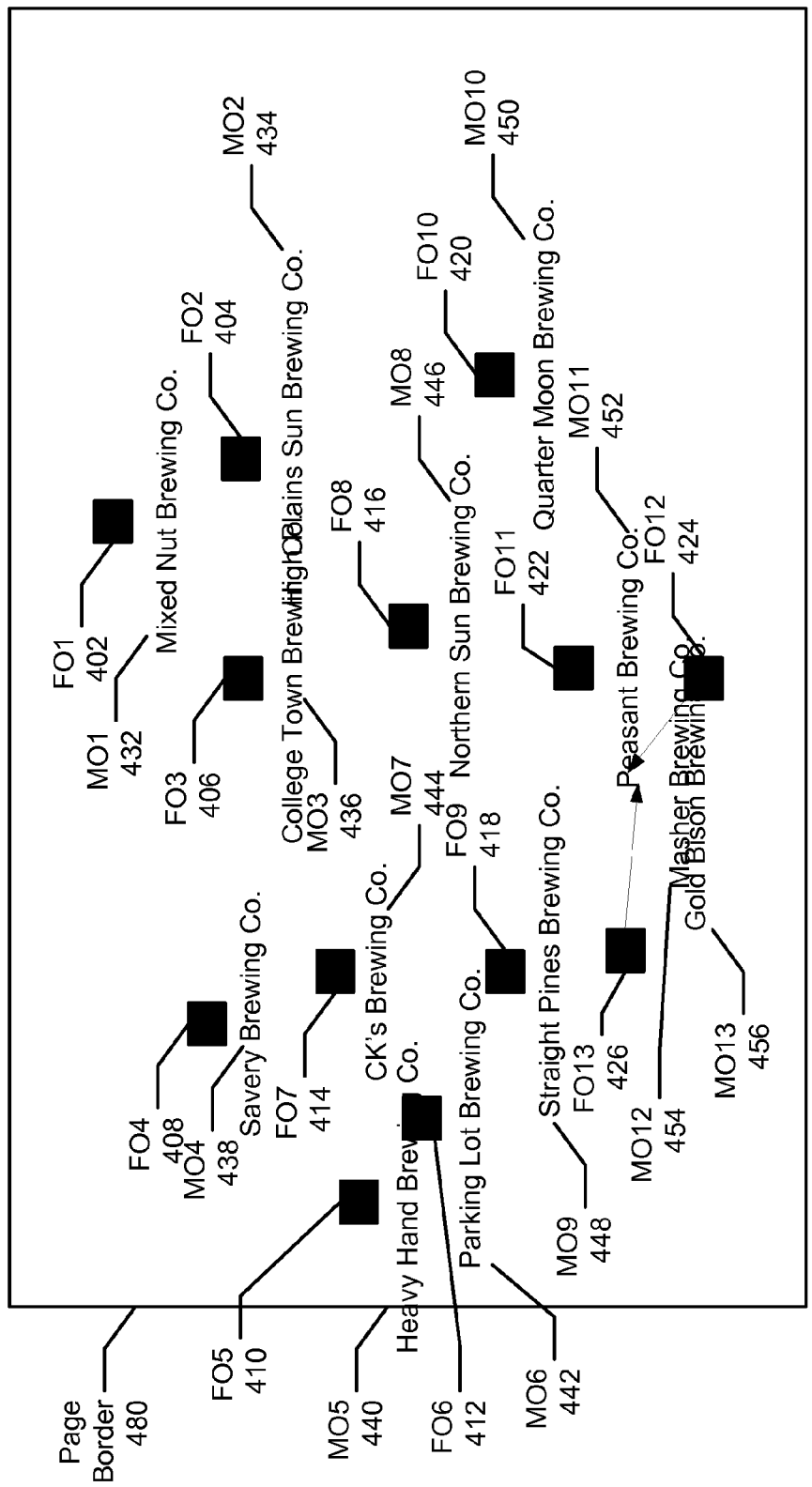

At this point, the MOs of the drawing need to be positioned. FIG. 3D shows the drawing with the FOs organized (as described above) with no overlap and with the MOs located in their initial locations. A number of overlaps involving MOs continue to exist. For example, MO5 (440) overlaps with FO6 (412). As another example, MO11 (452) overlaps with FO12 (424) and FO13 (426). As further examples, MO3 (436) overlaps with MO2 (434), and MO12 (454) overlaps with MO13 (456).

For the example, the MOs are processed starting with the MO associated with the Northern-most (i.e., top of the drawings) FO on the page to the MO associated with the Southern-most FO on the page. In this example, MO1 (432) is positioned on the page first, followed by MO4 (438), continuing down the page until ending with MO13 (456).

Figure 3E:
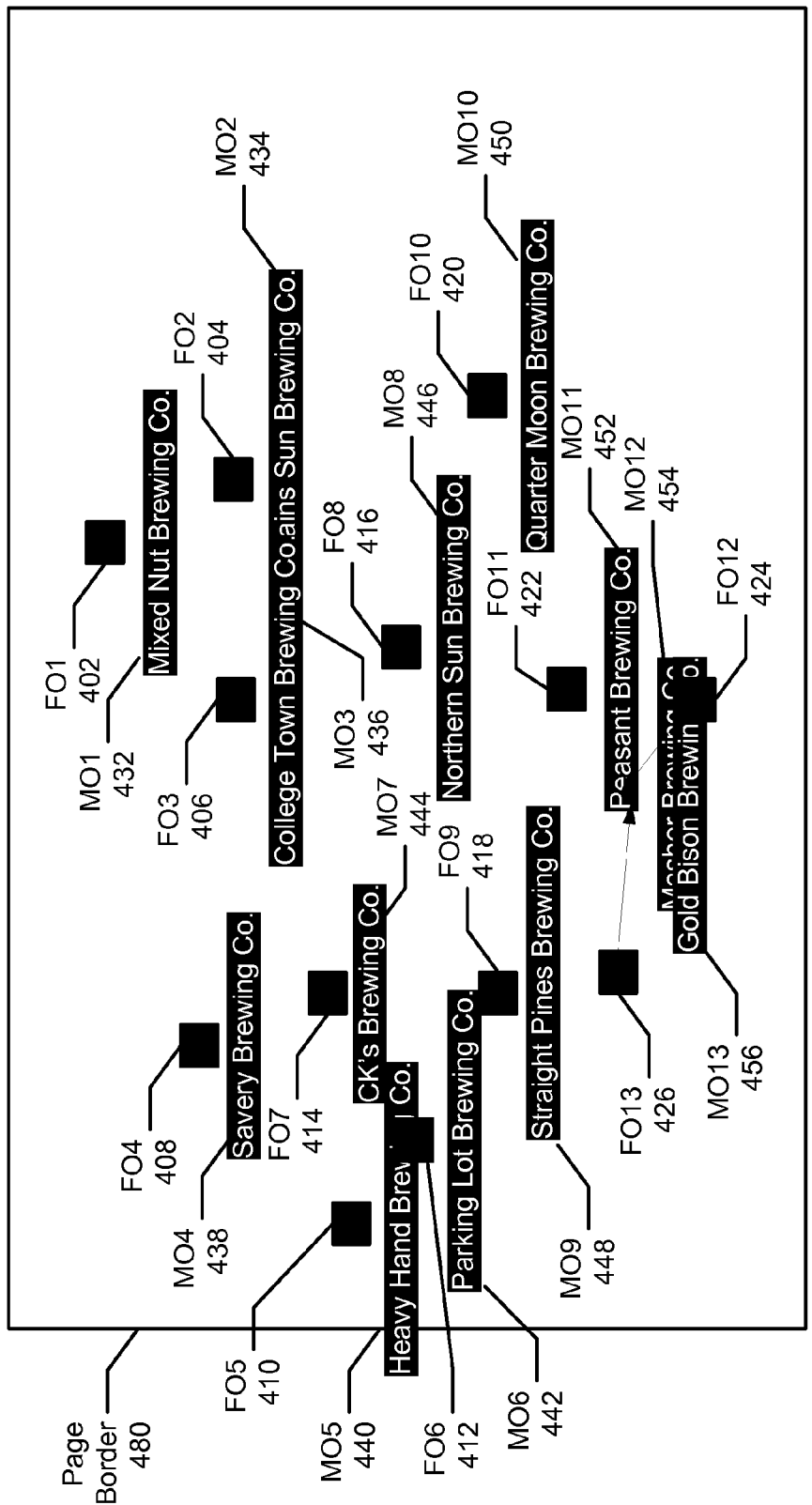

The MO footprints are used to generate MO frames. FIG. 3E shows the footprints of the MOs (e.g., MO1 (432), MO13 (456)) on the page. In this example, the footprints of the MOs (e.g., MO1 (432), MO 13 (456)) are shown as a black box (with white lettering used to help identify the footprint). The footprint (e.g., rectangle) of each MO is scaled by a factor of two to generate the frame for each MO. In other words, the frame for each MO is twice the size of the footprint of the MO. FIG. 3F shows an example of a frame for a MO at an initial location. Specifically, in FIG. 3F, frame MO5-1 (481) is the frame of MO5 (440) ("Heavy Hand Brewing Co."), which is associated with FO5 (410).

A set of coarse pixels in the CPA that corresponds to the frame for the MO is identified. It is determined that at least one coarse pixel in the set of coarse pixels is occupied status, the frame is moved. This process is repeated until there is no overlap, at which time, the coarse pixels in the CPA corresponding to the footprint for the MO are set to the occupied status (i.e., the location of the MO is fixed on the page). Two cases where an overlap exists with a MO, and how those overlaps are resolved, are shown in FIGS. 3F through 3I.

FIG. 3F shows four frames positioned around FO5 (410). Each of the frames is for the MO5 (440) named "Heavy Hand Brewing Co." Frame MO5-1 (481) in the initial position cannot be used because at least one coarse pixel in the set of coarse pixels within frame MO5-1 (481) is set to the occupied status (i.e., overlaps with the footprint of FO6 (412)). When it is determined that that frame MO5-1 (481) cannot be used, an attempt is made to process MO5-2 (482). Here, at least one coarse pixel in the set of coarse pixels within frame MO5-2 (482) is set to the occupied status (i.e., overlaps with the footprint of FO7 (414) and the frame (not shown) of MO7 (444)).

Continuing with FIG. 3F, after determining that frame MO5-2 (482) cannot be used, frame MO5-3 (483) is then processed. Here, at least one coarse pixel in the set of coarse pixels within frame MO5-3 (483) is set to the occupied status (i.e., overlaps with the footprint of FO7 (414)). Frame MO5-4 (484) is then processed. Here, no coarse pixel in the set of coarse pixels within frame MO5-4 (484) is occupied. However, a portion of the frame MO5-4 (484) extends beyond the edge of the drawing border (480). In one or more embodiments of the invention, the text may be wrapped (i.e., transform the MO from a single line of text to multiple lines of text) so that the MO5 (440) fits within frame MO5-4 (484).

FIG. 3G shows the result of processing MO5 (440). FIG. 3G also shows that a frame for a MO may be positioned in a location adjacent to the FO to which the MO is associated but not directly above, below, or to the side of the FO. Specifically, MO6 (442) in FIG. 3G is positioned to the lower left of FO6 (412), to which MO6 (442) is associated.

FIG. 3H shows another example of how overlaps are resolved. MO10 (450) and MO11 (452) have already been positioned because they are associated with FO10 (420) and FO11 (422), respectively, which are further up the page. While FO12 (424) is positioned lower on the page than FO13 (426), the callout for FO12 (424) points to a location on the page higher than the callout for FO13 (426). As such, it is determined that MO12 (454) is processed before MO13 (456). Frame MO12-1 (490) is initially processed. Here, no coarse pixel in the set of coarse pixels within frame MO12-1 (490) is set to the occupied status (i.e., overlaps with the footprint of any FO and/or the frame of any MO). While none of the other frames (frame MO12-2 (491), frame MO12-3 (492), frame MO12-4 (493)) shown in FIG. 3H are processed in this example, the other frames are shown for illustrative purposes. If any of the other frames (frame MO12-2 (491), frame MO12-3 (492), frame MO12-4 (493)) shown in FIG. 3H are processed, at least one coarse pixel in the set of coarse pixels of each of those frames would be set to the occupied status. FIG. 3I shows the result of processing MO12 (454). FIG. 3G also shows the subsequent result of processing MO13 (456).

Figure 3J:
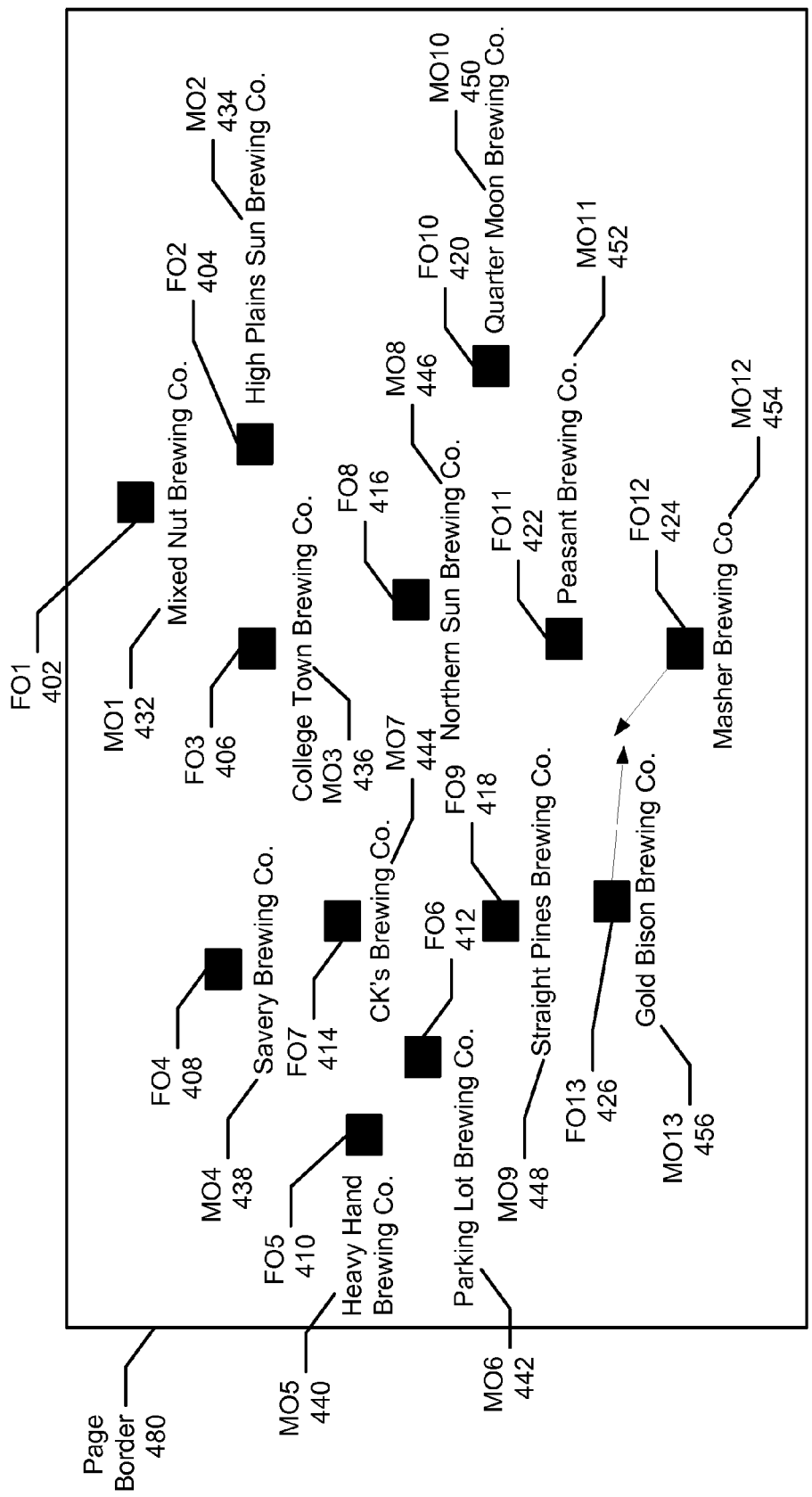

FIG. 3J shows the rendered drawings after the FOs and the MOs have been organized using embodiments of the invention.

Figure 4:
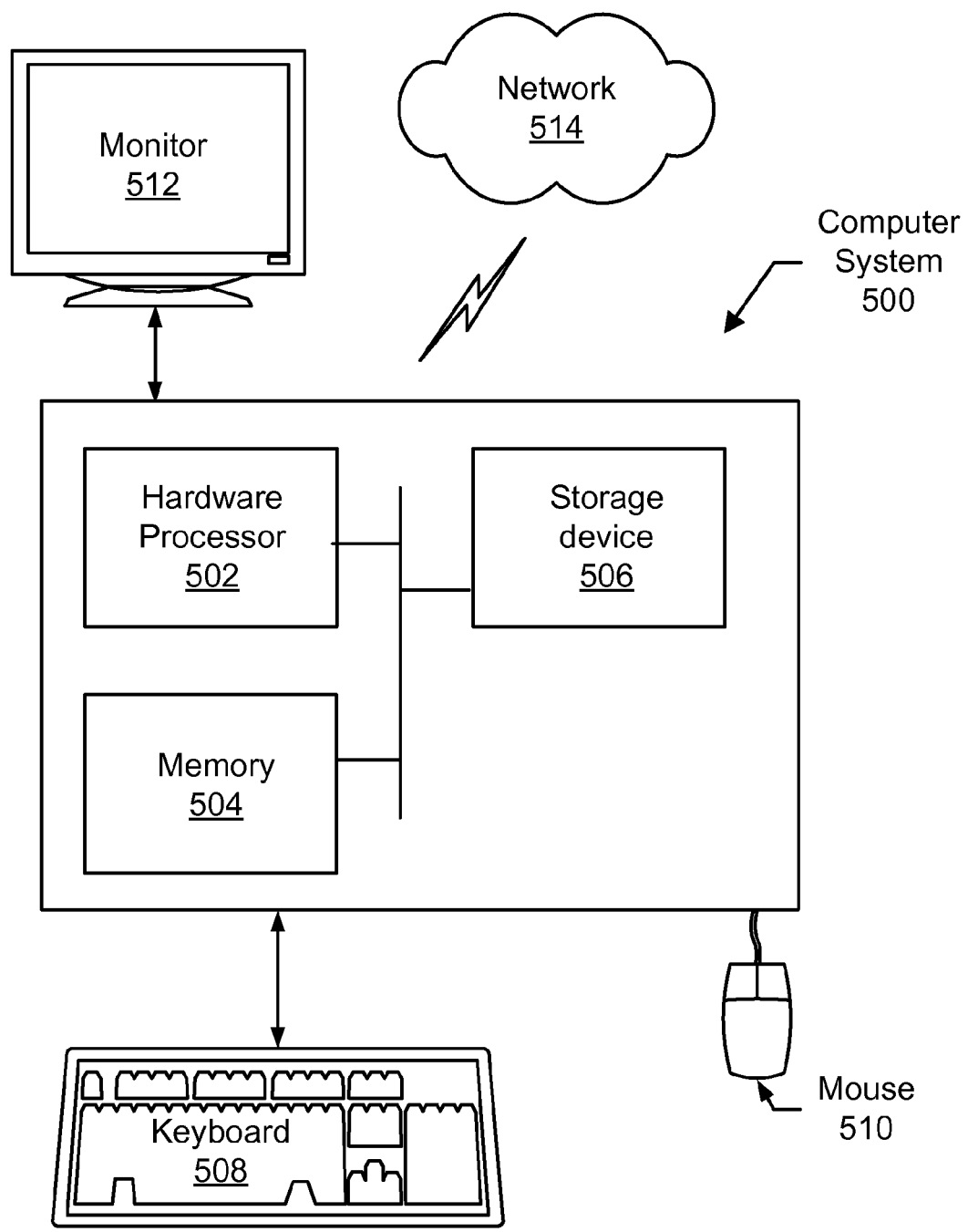
FIG. 4 shows a computer system in accordance with one or more embodiments of the invention.

FIG. 4 shows a computer system (500) on which one or more embodiments of a system (e.g., the client computer, the object layout device, as described above with respect to FIG. 1) may be implemented. The computer system (500) of FIG. 5 may be virtually any type of computer regardless of the platform being used. For example, as shown in FIG. 5, the computer system (500) includes one or more processor(s) (502) such as an integrated circuit, a central processing unit (CPU), or other hardware processor, associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a graphical display (512) (e.g., a liquid crystal display (LCD), a light-emitting diode (LED) display, a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Many different types of computer systems exist, and the aforementioned input and output means may take other forms, now known or later developed. Generally speaking, the computer system (500) includes at least the minimal processing, input, and/or output means necessary to practice embodiments of the invention.

Further, one or more elements of the aforementioned computer system (500) may be located at a remote location and connected to the other elements over a network. Further, embodiments of the invention may be implemented on a distributed system having a plurality of nodes, where each portion of the invention (e.g., confidence prediction engine, social source evaluation module, social score calculator) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other physical computer readable storage device.

One or more embodiments of the invention provide for organizing one or more objects on a page. Specifically, embodiments of the invention automatically organize the objects on a page so that none of the objects overlap. Further, the objects may be categorized as fixed or moveable, where fixed objects remain fixed (if possible) on the page and moveable objects, which are associated with a fixed object, may be moved to avoid overlap and/or clutter while maintaining its association with the fixed object.

Embodiments of the invention may save a user time by not having to manually move objects on a page so that all objects avoid overlap and/or clutter on the page. Embodiments of the invention may also save computer processing time. By using CPAs (rather than, for example, individual pixels), less memory is used to process each object and organize the objects on the page. Embodiments of the invention may also save computer resources by processing MOs associated with a FO. For example, if a location of an object and/or frame of an object needs to be revised using embodiments of the invention, only the FO to which the MO is associated is affected, rather than all objects on the page that have already been positioned. In other words, embodiments of the invention do not reevaluate all objects that have already been positioned when one object needs to be moved and/or modified.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for rendering a drawing, comprising:
   identifying a plurality of fixed objects (FOs) having a plurality of footprints within the drawing;
   identifying a plurality of moveable objects (MOs) having a plurality of locations within the drawing associated with the plurality of footprints;
   identifying, using a computer processor and within a coarse pixel array (CPA) having a two-dimensional array of coarse pixels representing a page space of the drawing, a plurality of coarse pixels corresponding to the plurality of footprints;
   setting, using the computer processor, the plurality of coarse pixels corresponding to the plurality of footprints to an occupied status;
   selecting, using the computer processor, a MO of the plurality of MOs having a first location;
   identifying, using the computer processor and based on the first location, a first set of coarse pixels in the CPA corresponding to a first frame of the MO;
   determining, using the computer processor, that at least one coarse pixel of the first set of coarse pixels is in the occupied status;
   generating, using the computer processor and in response to determining that the at least one coarse pixel of the first set of coarse pixels is in the occupied status, a second location for the MO;
   identifying, using the computer processor and based on the second location, a second set of coarse pixels in the CPA corresponding to a second frame of the MO;
   setting the second set of coarse pixels of the MO to the occupied status; and
   rendering the drawing by placing the MO at the second location on a page.

2. The method of claim 1, wherein the MO is a label comprising text with a font size and having a MO footprint, wherein the MO is associated with a first FO of the plurality of FOs.

3. The method of claim 2, wherein the first FO is clipart.

4. The method of claim 2, further comprising:
   calculating the first frame by scaling the MO footprint by a first factor.

5. The method of claim 4, further comprising:
   calculating a third frame by scaling the MO footprint by a second factor, wherein the first factor is greater than the second factor;
   identifying, after selecting the MO and based on the first location, a third set of coarse pixels in the CPA that correspond to the third frame of the MO; and
   determining that at least one coarse pixel of the third set of coarse pixels is set to the occupied status.

6. The method of claim 1, wherein the first location and the second location for the MO are adjacent to a first FO of the plurality of FOs.

7. The method of claim 1, further comprising:
   selecting a second FO of the plurality of FOs having a third location;
   identifying, based on the third location, a third set of coarse pixels in the CPA that correspond to a frame of the second FO;
   determining that at least one coarse pixel of the third set of coarse pixels is set to the occupied status;
   generating, in response to determining that the at least one coarse pixel of the fourth set of coarse pixels is set to the occupied status, a fourth location for the second FO;
   identifying, based on the fourth location, a fifth set of coarse pixels in the CPA that correspond to the frame of the second FO; and
   setting the fifth set of coarse pixels of the MO to the occupied status,
   wherein the second FO is selected after the first FO based on a FO hierarchy.

8. The method of claim 7, wherein the page comprises a callout linking the second FO to the third location.

9. A system for rendering a drawing, comprising:
   a hardware processor;
   a coarse pixel array (CPA) having a two-dimensional array of coarse pixels representing a page space of the drawing;
   a frame module configured to generate a first frame and a second frame for a moveable object (MO); and
   a layout engine executing on the hardware processor and configured to:

identify a plurality of fixed objects (FOs) having a plurality of footprints within the drawing;
set a plurality of coarse pixels in the CPA corresponding to the plurality of footprints to an occupied status;
identify, based on a first location of the MO, a first set of coarse pixels in the CPA corresponding to the first frame;
determine that at least one coarse pixel of the first set of coarse pixels is in the occupied status;
identify, based on a second location associated with the MO, a second set of coarse pixels in the CPA corresponding to the second frame of the MO; and
render the drawing by placing the MO at the second location on a page.

10. The system of claim 9, wherein the layout engine is further configured to:
select a FO of the plurality of FOs having a third location;
identify, based on the third location, a third set of coarse pixels in the CPA corresponding to a frame of the FO;
determine that at least one coarse pixel of the third set of coarse pixels is set to the occupied status;
generate, in response to determining that the at least one coarse pixel of the third set of coarse pixels is set to the occupied status, a fourth location for the FO;
identify, based on the fourth location, a fourth set of coarse pixels in the CPA that correspond to the frame of the FO; and
set the fourth set of coarse pixels to the occupied status.

11. The system of claim 10, wherein the FO is clipart.

12. The system of claim 10, wherein the FO is a marker in a scatter plot.

13. The system of claim 9, wherein the MO is a label comprising text with a font size and having a MO footprint, and wherein the MO is associated with a first FO of the plurality of FOs.

14. The system of claim 9, further comprising:
a FO list storing a FO hierarchy; and
a MO list storing a MO hierarchy.

15. A non-statutory computer readable medium storing instructions for rendering a drawing, the instructions comprising functionality to:
identify a plurality of fixed objects (FOs) having a plurality of footprints within the drawing;
identify a plurality of moveable objects (MOs) having a plurality of locations within the drawing associated with the plurality of footprints;
identify, within a coarse pixel array (CPA) having a two-dimensional array of coarse pixels representing a page space of the drawing, a plurality of coarse pixels corresponding to the plurality of footprints;
set the plurality of coarse pixels corresponding to the plurality of footprints to an occupied status;
select a MO of the plurality of MOs having a first location;
identify, based on the first location, a first set of coarse pixels in the CPA corresponding to a first frame of the MO;
determine that at least one coarse pixel of the first set of coarse pixels is in the occupied status;
generate, in response to determining that the at least one coarse pixel of the first set of coarse pixels is in the occupied status, a second location for the MO;
identify, based on the second location, a second set of coarse pixels in the CPA corresponding to a second frame of the MO;
set the second set of coarse pixels of the MO to the occupied status; and
render the drawing by placing the MO at the second location on a page.

16. The non-statutory computer readable medium of claim 15, wherein the MO is a label comprising text with a font size and having a MO footprint, and wherein the MO is associated with a first FO of the plurality of FOs.

17. The non-statutory computer readable medium of claim 16, the instructions further comprising functionality to:
calculate the first frame by scaling the MO footprint by a first factor.

18. The non-statutory computer readable medium of claim 17, the instructions further comprising functionality to:
calculate a third frame by scaling the MO footprint by a second factor, wherein the first factor is greater than the second factor;
identify, after selecting the MO and based on the first location, a third set of coarse pixels in the CPA that correspond to the third frame of the MO;
determine that at least one coarse pixel of the third set of coarse pixels is set to the occupied status.

19. The non-statutory computer readable medium of claim 15, the instructions further comprising functionality to:
select a second FO of the plurality of FOs having a third location;
identify, based on the third location, a third set of coarse pixels in the CPA that correspond to a frame of the second FO;
determine that at least one coarse pixel of the third set of coarse pixels is set to the occupied status;
generate, in response to determining that the at least one coarse pixel of the fourth set of coarse pixels is set to the occupied status, a fourth location for the second FO;
identify, based on the fourth location, a fifth set of coarse pixels in the CPA that correspond to the frame of the second FO; and
set the fifth set of coarse pixels of the MO to the occupied status,
wherein the second FO is selected after the first FO based on a FO hierarchy.

20. The non-transitory computer readable medium of claim 19, wherein the page comprises a callout linking the second FO to the third location.

* * * * *